(12) United States Patent
Liu et al.

(10) Patent No.: US 11,926,499 B2
(45) Date of Patent: Mar. 12, 2024

(54) FOLDING DEVICE

(71) Applicant: BOE Technology Group Co., Ltd., Beijing (CN)

(72) Inventors: Shuqi Liu, Beijing (CN); Xinhong Lu, Beijing (CN); Wenyue Fu, Beijing (CN); Haoran Gao, Beijing (CN); Guangcai Yuan, Beijing (CN); Li Li, Beijing (CN); Shaodong Sun, Beijing (CN); Song Fang, Beijing (CN); Dongfeng Du, Beijing (CN); Qi Qi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 246 days.

(21) Appl. No.: 17/631,090

(22) PCT Filed: Apr. 9, 2021

(86) PCT No.: PCT/CN2021/086158
§ 371 (c)(1),
(2) Date: Jan. 28, 2022

(87) PCT Pub. No.: WO2021/238440
PCT Pub. Date: Dec. 2, 2021

(65) Prior Publication Data
US 2022/0250870 A1    Aug. 11, 2022

(30) Foreign Application Priority Data

May 27, 2020 (CN) .......................... 202010463788.5

(51) Int. Cl.
| | |
|---|---|
| B65H 45/16 | (2006.01) |
| B05C 5/02 | (2006.01) |
| B05C 9/12 | (2006.01) |
| B05C 13/02 | (2006.01) |
| B65H 45/30 | (2006.01) |

(52) U.S. Cl.
CPC .......... *B65H 45/16* (2013.01); *B05C 5/0212* (2013.01); *B05C 9/12* (2013.01); *B05C 13/02* (2013.01); *B65H 45/30* (2013.01)

(58) Field of Classification Search
CPC combination set(s) only.
See application file for complete search history.

(56) References Cited

U.S. PATENT DOCUMENTS 8,179,668 B2 * 5/2012 Wei ...................... H04M 1/0237
                                                              361/679.01
10,603,843 B2 * 3/2020 Kim ...................... H10K 50/841
                                   (Continued)

FOREIGN PATENT DOCUMENTS

| CN | 102113420 A | 6/2011 |
|---|---|---|
| CN | 205701261 U | 11/2016 |

(Continued)

OTHER PUBLICATIONS

First Office Action dated Apr. 8, 2022 for application No. CN202010463788.5 with English translation attached.

*Primary Examiner* — Lisa Lea-Edmonds
(74) *Attorney, Agent, or Firm* — Nath, Goldberg & Meyer; Joshua B. Goldberg

(57) ABSTRACT

A folding device is provided. The folding device includes a bearing and fixing mechanism (1) configured to bear and fix a main body portion (21) of a to-be-folded device (2); a folding mechanism (3) located on at least one side of the bearing and fixing mechanism (1), the folding mechanism (3) being rotatably connected to the bearing and fixing mechanism (1) and configured to bear and fix a to-be-folded portion (22) of the to-be-folded device (2); and a driving mechanism (4) connected to the folding mechanism (3), the driving mechanism (4) being configured to drive the folding mechanism (3) to turn relative to the bearing and fixing mechanism (1), so as to fold the to-be-folded portion (22) to (Continued)

a side in a thickness direction of the main body portion (21). The folding device can fold automatically, and manual folding is avoided.

20 Claims, 7 Drawing Sheets

(56) References Cited

U.S. PATENT DOCUMENTS

| | | | | |
|---|---|---|---|---|
| 10,606,320 | B2 * | 3/2020 | Bi | ................... G06F 1/1681 |
| 2022/0250870 | A1 * | 8/2022 | Liu | ................... G02F 1/1303 |
| 2022/0339855 | A1 * | 10/2022 | Liu | ................... B29C 53/80 |

FOREIGN PATENT DOCUMENTS

| | | |
|---|---|---|
| CN | 106504646 A | 3/2017 |
| CN | 106710450 A | 5/2017 |
| CN | 206350241 U | 7/2017 |
| CN | 107961951 A | 4/2018 |
| CN | 108198513 A | 6/2018 |
| CN | 108225938 A | 6/2018 |
| CN | 109482425 A | 3/2019 |
| CN | 110505925 A | 11/2019 |
| CN | 210337792 U | 4/2020 |
| CN | 210461373 U | 5/2020 |
| CN | 212503294 U | 2/2021 |
| IN | 208271484 U | 12/2018 |
| JP | 2001232269 A | 8/2001 |
| JP | 2003340939 A | 12/2003 |

* cited by examiner

FOLDING DEVICE

This is a National Phase Application filed under 35 U.S.C. 371 as a national stage of PCT/CN2021/086158, filed on Apr. 9, 2021, an application claiming the priority of the Chinese patent application No. 202010463788.5 filed on May 27, 2020, the contents of each of which are incorporated herein by reference in their entirety.

TECHNICAL HELD

The present disclosure relates to the field of mechanical manufacturing, in particular to a folding device.

BACKGROUND

In the manufacturing process of a display screen, the driving circuit on at least one side of the display screen needs to be folded to the backlight side of the display screen. However, folding by manual involves great difficulty, which could easily lead to damages to the connection wiring between the display area and the driving circuit.

SUMMARY

The present disclosure seeks to solve at least one of the technical problems in the existing technology, and provides a folding device.

In order to achieve the above object, the present disclosure provides a folding device, including:
  a bearing and fixing mechanism configured to bear and fix a main body portion of a to-be-folded device;
  a folding mechanism located on at least one side of the bearing and fixing mechanism, the folding mechanism being rotatably connected to the bearing and fixing mechanism and configured to bear and fix a to-be-folded portion of the to-be-folded device;
  a driving mechanism connected to the folding mechanism, the driving mechanism being configured to drive the folding mechanism to turn relative to the bearing and fixing mechanism, so as to fold the to-be-folded portion to one side in a thickness direction of the main body portion.

In some embodiments, the folding device further includes: a base;
  the bearing and fixing mechanism includes:
  a first bearing stage disposed on the base, the first bearing stage having a first bearing surface located on a side of the first bearing stage away from the base;
  side plates located on opposite skies of the first bearing stage, the side plates being disposed on the base;
  the folding mechanism is connected to the side plate through a first rotating shaft, and a distance between an axis of the first rotating shaft and the base is larger than a distance between the first bearing surface and the base.

In some embodiments, the bearing and fixing mechanism further includes: a fixing member disposed on at least one side of the first bearing stage, the fixing member being disposed on the base, the fixing member having a fixed state and an unfixed state, wherein a portion of the fixing member in the fixed state presses and covers the main body portion; and an orthographic projection of the fixing member in the unfixed state on the base is positioned outside an orthographic projection of the first bearing stage on the base;
  the fixing member and the folding mechanism are located on different sides of the first bearing stage.

In some embodiments, the fixing member includes:
  a second rotating shaft disposed on the base;
  a fixing part rotatably connected to the base through the second rotating shaft;
  a pressing and covering part disposed on the fixing part, the pressing and covering part including a pressing and covering end facing the to-be-folded device, the pressing and covering end of the pressing and covering part and the second rotating shaft being located on the same side of the fixing part, the pressing and covering part being capable of moving close to or away from the base, and the pressing and covering end being configured to press and cover the main body portion on the bearing and fixing mechanism when the fixing part is in the fixed state.

In some embodiments, the bearing and fixing mechanism further includes: a first driving member connected to the fixing member and configured to drive the fixing member to switch between the fixed state and the unfixed state.

In some embodiments, the bearing and fixing mechanism further includes: a limiter disposed on at least one side of the first bearing stage, a portion of the limiter being positioned on the first bearing surface and abutting a boundary of a preset area on the first bearing surface, the preset area being an area adapted to bear the main body portion.

In some embodiments, a first vacuum absorption hole is disposed on the first bearing stage, and one end of the first vacuum absorption hole is positioned on the first bearing surface.

In some embodiments, the folding mechanism includes:
  a mounting carrier rotatably connected to the bearing and fixing mechanism;
  a second bearing stage disposed on the mounting carrier, the second bearing stage having a second bearing surface adapted to bear the to-be-folded portion, a second vacuum adsorption hole being disposed on the second bearing stage, and one end of the second vacuum adsorption hole being positioned on the second bearing surface.

In some embodiments, the mounting carrier includes: a first mounting arm and a second mounting arm disposed opposite to each other, and a connecting arm fixedly connected between the first mounting arm and the second mounting arm; wherein the first mounting arm and the second mounting arm are each rotatably connected to the bearing and fixing mechanism, the second bearing stage being connected between the first mounting arm and the second mounting arm.

In some embodiments, a side of the first mounting arm facing the second mounting arm and a side of the second mounting arm facing the first mounting arm are each provided with a mounting slot;
  the folding mechanism further includes:
  bearing stage mounts disposed at both ends of the second bearing stage, at least a portion of the bearing stage mount extends into the mounting slot; the bearing stage mounts being displaceable relative to the mounting carrier along an extension direction of the first mounting arm;
  at least one support disposed on the connecting arm and having a supporting end facing the second bearing stage;
  an elastic telescopic member with one end connected to the second bearing stage and the other end connected to the connecting arm;
  the support has an extended state and a retracted state, when the support is in the extended state a distance between the supporting end and the connecting arm is larger than when the support is in the retracted state, and is larger than the length of the elastic telescopic member in a natural state.

In some embodiments, the folding mechanism further includes: a rolling member disposed on the bearing stage mount and configured to roll along an inner wall of the mounting slot.

In some embodiments, both an upper surface and a lower surface of the bearing stage mount are provided with the rolling member, the rolling member being a spherical plunger.

In some embodiments, the folding mechanism comprises two of the supports, the two supports being disposed proximate an end of the second bearing stage facing the first mounting arm and an end of the second bearing stage facing the second mounting arm, respectively.

In some embodiments, the second bearing stage is a transparent stage.

In some embodiments, the folding device further includes:
a glue applicator mechanism configured to apply glue to the to-be-folded portion;
a curing mechanism configured to cure the glue on the to-be-folded portion.

In some embodiments, the glue applicator mechanism includes:
a first guide rail disposed on the base and extending in a first direction;
a stand disposed on the first guide rail and configured to move along the first guide rail;
a second guide rail disposed on the stand and extending in a second direction intersecting the first direction;
an applicator head disposed on the second guide rail and configured to output glue and move along the second guide rail.

In some embodiments, two of the first guide rails are disposed on both sides of the bearing and fixing mechanism;
the stand includes: two upright portions disposed opposite to each other, the two upright portions being disposed on the first guide rails on both sides of the bearing and fixing mechanism, respectively; wherein two ends of the second guide rail are disposed on the two upright portions, respectively; and the upright portions are configured to move along the first guide rail.

In some embodiments, the stand further includes: a beam connected between the two upright portions, the second guide rail being positioned on a side of the beam away from the base;
the glue applicator mechanism further includes a mounting base, the mounting base including a moving part and a mechanical body mounting part, the moving part being disposed on the second guide rail and supported on the beam, the applicator head being fixedly disposed on the mechanical body mounting part, the moving part being adapted to move along the second guide rail.

In some embodiments, the glue applicator mechanism further includes: a third driving member configured to drive the stand to move along the first guide rail, and to drive the applicator head to move along the second guide rail.

In some embodiments, the curing mechanism includes a curing lamp disposed on a side of the stand facing the base.

BRIEF DESCRIPTION OF DRAWINGS

The accompanying drawings, which constitute a part of the specification, are to provide a further understanding of embodiments of the present disclosure, and to explain the present disclosure together with embodiments of the present disclosure but not to limit the present disclosure. In the drawings.

DETAIL DESCRIPTION OF EMBODIMENTS

The embodiments of the present disclosure are described in further detail below with reference to the accompanying drawings. It should be understood that the embodiments described herein below are merely used to describe and explain the present disclosure only and are not intended to limit the present disclosure.

Unless otherwise defined, technical or scientific terms used in the embodiments of the present disclosure should have the ordinary meaning as understood by one of ordinary skill in the art to which the present disclosure belongs. The use of "first", "second", and the like in this disclosure is not intended to indicate any order, quantity, or importance, but rather is used to distinguish one component from other components. Similarly, the term "including" or "comprising", and the like, means that the element or item preceding the word includes the element or item listed after the word and its equivalent, but does not exclude other elements or items. The terms "connecting" or "connected", and the like, are not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Figure 1:
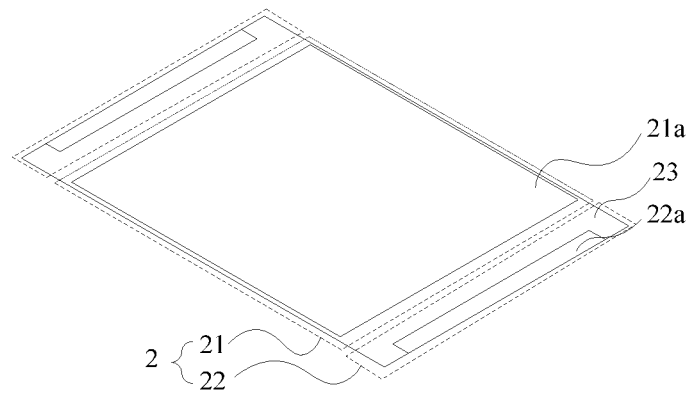
FIG. 1 is a schematic structural view of a to-be-folded device which is to be folded according to some embodiments of the present disclosure.

The embodiment of the disclosure provides a folding device, which is configured to fold a to-be-folded device and to fold a to-be-folded portion of the to-be-folded device to one side of a main body portion along the thickness direction of the main body portion. The to-be-folded device may be a display substrate, the main body portion of the to-be-folded device may be a portion of the display substrate for display, and the to-be-folded portion may be a portion of the display substrate to be folded to the backlight side of the main body portion. FIG. 1 is a schematic structural view of a to-be-folded device which is to be folded according to some embodiments of the present disclosure, and as shown in FIG. 1, in an embodiment of the present disclosure, a to-be-folded device 2 may include a main body portion 21 and a to-be-folded portion 22 located on at least one side of the main body portion 21. Taking the case that the to-be-folded device is a display substrate as an example, the main body portion 21 includes a light emitting device for display, such as a micro light emitting diode (mini/micro LED), and the to-be-folded portion 22 includes a driving circuit 22a configured to drive the light emitting device to emit light. The light emitting device and the driving circuit 22a are both disposed on a flexible substrate 23, the material of the flexible substrate 23 may include Polyimide (PI), and the light emitting device and the driving circuit 22a may be connected through signal lines disposed on the flexible substrate 23, so that the driving circuit 22a may provide electric signals for display to the light emitting device through the signal lines. The main body portion 21 further includes a bearing plate 21a of a comparatively great rigidity, such as a glass plate. The bearing plate 21a and the light emitting device are located on opposite surfaces of the flexible substrate 23. In the manufacturing process of the to-be-folded device 2, the to-be-folded portion 22 needs to be folded to the backlight side of the main body portion 21. In addition, a bearing plate may also be provided at the position of the driving circuit 22a, and the bearing plate and the driving circuit 22a are located on opposite surfaces of the flexible substrate 23, respectively.

Figure 2:
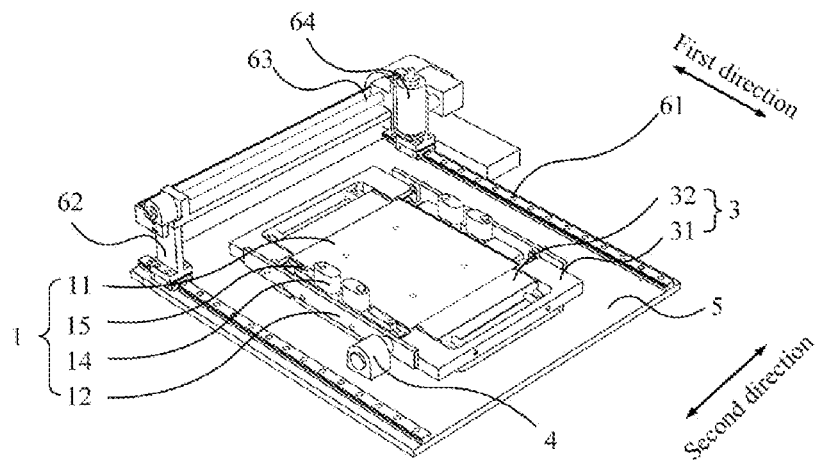
FIG. 2 is a schematic structural view of a folding device according to some embodiments of the present disclosure.
Figure 3:
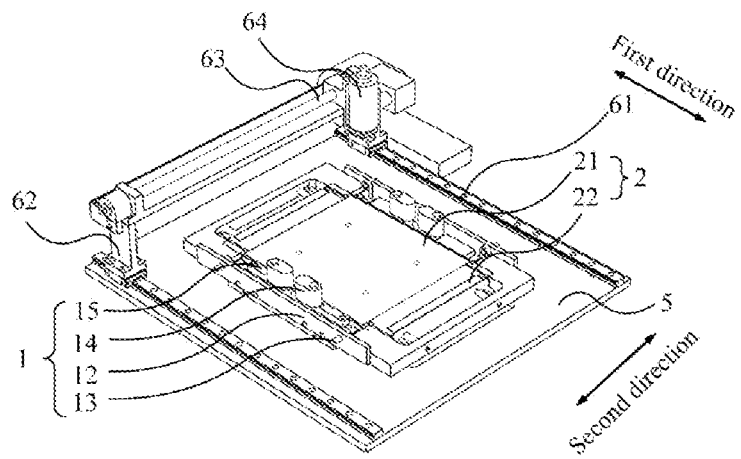
FIG. 3 is a schematic view of a to-be-folded device placed on a folding device according to some embodiments of the present disclosure.

FIG. 2 is a schematic structural view of the folding device according to some embodiments of the present disclosure, and FIG. 3 is a schematic view of the to-be-folded device placed on the folding device according to some embodiments of the present disclosure. Referring to FIGS. 2 and 3, the folding device includes: a bearing and fixing mechanism 1, a folding mechanism 3 disposed on at least one side of the bearing and fixing mechanism 1, and a driving mechanism 4, The driving mechanism 4 is hidden in FIG. 3 in order to show a first rotating shaft 13. The bearing and fixing mechanism 1 is configured to bear and fix the main body portion 21 of the to-be-folded device 2. The folding mechanism 3 is rotatably connected to the bearing and fixing mechanism 1 and is configured to bear and fix the to-be-folded portion 22 of the to-be-folded device 2. The driving mechanism 4 is connected to the folding mechanism 3 and is configured to drive the folding mechanism 3 to turn relative to the bearing and fixing mechanism 1, so as to fold the to-be-folded portion 22 of the to-be-folded device 2 to one side of the main body portion 21 along a thickness direction of the main body portion 21, for example, to fold the to-be-folded portion 22 of the display substrate to the backlight side of the main body portion 21.

In the embodiment of the present disclosure, the to-be-folded device 2 may include one to-be-folded portion 22, and may also include two to-be-folded portions 22. Taking the case that the to-be-folded device 2 includes two to-be-folded portions 22 as an example, the two to-be-folded portions 22 are located on both sides of the main body portion 21. The number of the folding mechanism 3 may be one or two. When the number of the folding mechanisms 3 is two, the two folding mechanisms 3 may be disposed on both sides of the bearing and fixing mechanism 1 along a first direction, and the two folding mechanisms 3 may be configured to fold the two to-be-folded portions 22, respectively. When the folding device includes two folding mechanisms 3, the two folding mechanisms 3 may be controlled by the same driving mechanism 4 or by two driving mechanisms 4, respectively, which are not limited herein. For example, when two folding mechanisms 3 are controlled by the same driving mechanism 4, the driving mechanism 4 may control the two folding mechanisms 3 to perform folding simultaneously through a transmission mechanism. The transmission mechanism may be a gear, a rack, etc., or other structures known to those skilled in the art, and is not limited herein.

As shown in FIG. 3, the main body portion 21 of the to-be-folded device 2 is supported and fixed on the bearing and fixing mechanism 1, the to-be-folded portion 22 of the to-be-folded device 2 is supported and fixed on the folding mechanism 3, one end of the folding mechanism 3 close to the bearing and fixing mechanism 1 may be rotatably connected to the bearing and fixing mechanism 1 through the first rotating shaft 13, and the folding mechanism 3 can rotate around the first rotating shaft 13 under the driving of the driving mechanism 4, so as to turn toward the bearing and fixing part 1, and further turn the to-be-folded portion 22 on the folding mechanism 3 over the bearing and fixing part 1, that is, fold the to-be-folded portion 22 to one side of the main body portion 21 along the thickness direction of the main body portion 21.

By adopting the folding device of the embodiment of the disclosure, the to-be-folded portion 22 of the to-be-folded device 2 can be folded to the backlight side of the main body portion 21 through the folding mechanism 3. Compared with manual operation, when the folding device of the embodiment of the disclosure folds the to-be-folded device 2, it is beneficial to control the folding force and reduce the damage to the to-be-folded device 2, large-scale production can be realized, and the operation efficiency can be improved.

The folding device according to the embodiment of the present disclosure will be described in detail below with reference to the accompanying drawings by taking the case that the to-be-folded device is a display substrate as an example.

As shown in FIG. 2, in some embodiments, the folding device further includes a base 5. The bearing and fixing mechanism 1 includes: a first bearing stage 11, and side plates 12 located on each of two opposite sides of the first bearing stage 11 in a second direction intersecting the first direction. For example, the second direction is perpendicular to the first direction. The first bearing stage 11 is disposed on the base 5, the first bearing stage 11 has a first bearing surface, and the first bearing surface is located on one side of the first bearing stage 11 away from the base 5 and configured to bear the main body portion 21. The side plates 12 are disposed on the base 5. The folding mechanism 3 is connected to the side plates 12 through the first rotating shaft 13.

For example, a mounting hole can be disposed on the side plate 12. As shown in FIG. 3, one end of the first rotating shaft 13 may be connected to the folding mechanism 3, and the other end of the first rotating shaft 13 may pass through the mounting hole on the side plate 12 to be connected to the driving mechanism 4. The driving mechanism 4 can drive the first rotating shaft 13 to rotate, so as to drive the folding mechanism 3 to turn.

In some embodiments, since the main body portion 21 and the to-be-folded portion 22 of the to-be-folded device 2 have a certain thickness, in order to prevent the to-be-folded portion 22 folded to the backlight side of the main body portion 21 from excessively pressing the flexible substrate 23, a distance may be set between the axis of the first rotating shaft 13 and the base 5, and the distance is larger than a distance between the first bearing surface and the base 5. For example, the distance between the first rotating shaft 13 and the base 5 is a first preset distance, and the distance between the first bearing surface and the base 5 is a second preset distance, then the difference between the first preset distance and the second preset distance may be set according to the thickness of the to-be-folded device 2, so as to ensure that after the folding mechanism 3 is folded by 180° about the axis of the first rotating shaft 13, a gap is generated between the surface of the folding mechanism 3 opposite to the first bearing stage 11 and the first bearing surface, so that after the to-be-folded portion 22 is folded to the backlight side of the main body portion 21, the to-be-folded portion 22 is substantially parallel to the main body portion 21, without excessively pressing the flexible substrate 23.

Figure 4:
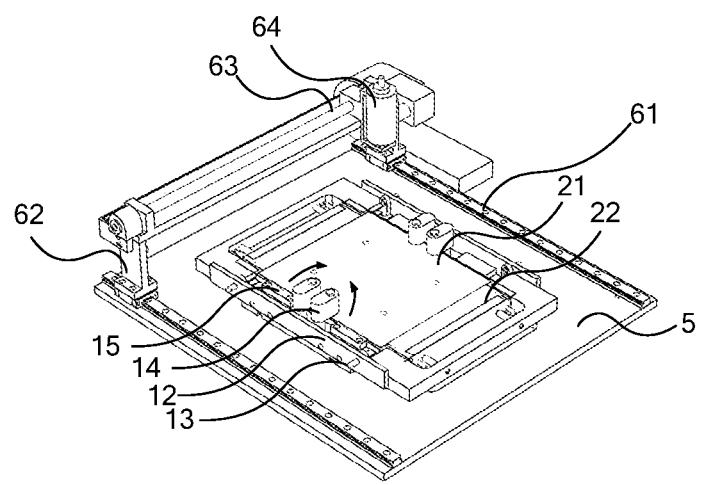
FIG. 4 is a schematic view of a folding device according to some embodiments of the present disclosure with fixing members in a fixed state.

As shown in FIG. 3, in some embodiments, the bearing and fixing mechanism 1 further includes: a fixing member 14 disposed on at least one side of the first bearing stage 11. The fixing member 14 is disposed on the base 5, and has a fixed state and an unfixed state. FIG. 4 is a schematic view of a folding device according to some embodiments of the present disclosure with fixing members in the fixed state. As shown in FIG. 4, a portion of the fixing member 14 in the fixed state presses and covers the main body portion 21. As shown in FIG. 3, an orthographic projection of the fixing member 14 in the unfixed state on the base 5 is positioned outside an orthographic projection of the first bearing stage 11 on the base 5. The fixing member 14 and the folding mechanism 3 are positioned on different sides of the first hearing stage 11.

For example, the folding device may include four fixing members 14. The four fixing members 14 are grouped into two pairs, and the two pairs of fixing members 14 are disposed on two sides of the first bearing stage 11 along the second direction, respectively. When the fixing member 14 is in the unfixed state, the orthographic projection of the fixing member 14 on the base 5 is positioned outside the orthographic projection of the first bearing stage 11 on the base 5, so that installation or disassembly of the to-be-folded device 2 in or from the folding device is facilitated. When the fixing member 14 is in the fixed state, a portion of the fixing member 14 presses and covers the main body portion 21, so that the main body portion 21 is fixed on the first bearing surface. It should be noted that the number of the fixing member 14 described above is only exemplary, and in practical applications, the fixing member 14 may be set to other numbers.

Figure 5:
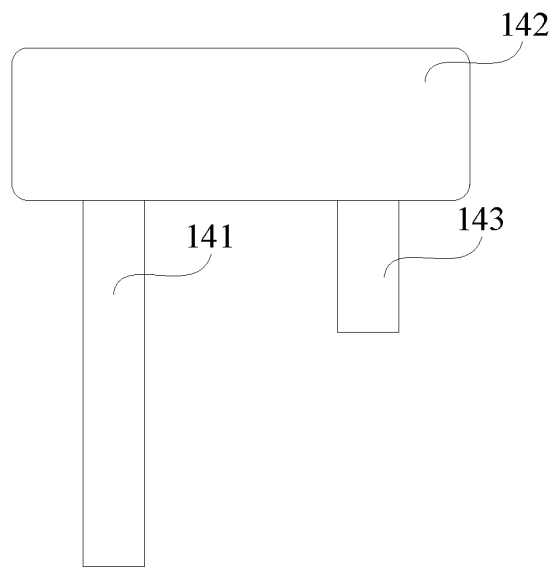
FIG. 5 is a schematic view of the fixing member according to some embodiments of the present disclosure.

FIG. 5 is a schematic structural view of a fixing member according to some embodiments of the present disclosure. As shown in FIGS. 3 to 5, in some embodiments, the fixing member 14 includes: a second rotating shaft 141, a fixing part 142, and a pressing and covering part 143 disposed on the fixing part 142. The second rotation shaft 141 is disposed on the base 5. The fixing part 142 is rotatably connected to the base 5 through the second rotating shaft 141. The pressing and covering part 143 has a pressing and covering end facing the to-be-folded device 2, the pressing and covering end of the pressing and covering part 143 and the second rotating shaft 141 are both located on the same side of the fixing part 142, the pressing and covering part 143 is capable of moving close to or away from the base 5, and when the fixing part 14 is in the fixed state, the pressing and covering part 143 presses and covers the main body portion 21.

The embodiment of the present disclosure does not limit the manner in which the pressing and covering part 143 moves close to or away from the base. For example, the pressing and covering part 143 may be pneumatically driven to move, and for example, a gas cavity is formed in the fixing part 142, a mounting hole is disposed on a bottom wall of the gas cavity, a portion of the pressing and covering part 143 is hermetically disposed in the mounting hole, and the pressing and covering part 143 is driven to move close to or away from the base 5 by inputting gas into or extracting gas from the gas cavity in the fixing part 142.

In the embodiment of the present disclosure, a bottom end of the second rotating shaft 141 may be fixed on the base 5, and the fixing part 142 is rotatably connected to the second rotating shaft 141; alternatively, the fixing part 142 is fixedly connected to the second rotating shaft 141, and the bottom end of the second rotating shaft 141 is rotatably connected to the base 5.

For example, as shown in FIGS. 3 and 4, the fixing part 142 may rotate around the axis of the second rotating shaft 141. When the fixing member 14 is switched to the unfixed state, the pressing and covering part 143 may be lifted, so that the pressing and covering part 143 does not contact with the main body portion 21, and the fixing part 142 is controlled to rotate out of the first bearing stage 11 (as shown in FIG. 3); when the fixing member 142 is in the fixed state, the fixing member 142 may be controlled to rotate, so that the pressing and covering part 143 is located above the first bearing stage 11, and the pressing and covering part 143 is controlled to descend, so as to press and cover the main body portion 21, so that the main body portion 21 and the first bearing stage 11 are kept relatively fixed.

In some embodiments, the switching of the fixing member 14 between the fixed state and the unfixed state may be controlled manually or automatically. For example, in some embodiments, the bearing and fixing mechanism 1 further includes: a first driving member (not shown) connected to the fixing member 14 and configured to drive the fixing member 14 to switch between the fixed state and the unfixed state.

In the above embodiment, the main body portion 21 of the to-be-folded device 2 is fixed on the first bearing stage 11 by the fixing member 14, and this fixing manner can prevent the light emitting device of the to-be-folded device 2 from being damaged. However, it should be noted the fixing manner of the main body portion 21 is not limited to this, for example, the first bearing stage 11 may be provided with a first vacuum absorption hole (not shown), one end of the first vacuum absorption hole is positioned on the first bearing stage, and the other end of the vacuum absorption hole is connected to a vacuuming device, so that the main body portion 21 is fixed to the first bearing stage 11 by vacuuming. Of course, the two fixing manners may be combined, that is, the fixing member 14 is provided while the first vacuum absorption hole is provided on the first bearing stage 11.

In some embodiments, the bearing and fixing mechanism 1 further includes: a limiter 15 disposed on at least one side of the first hearing stage 11, and a portion of the limiter 15 is located on the first bearing surface and abuts a boundary (edge) of a preset area on the first bearing surface, where the preset area is an area adapted to bear the main body portion 21. When the main body portion 21 of the to-be-folded device 2 is placed on the first bearing stage 11, the boundary of the to-be-folded device 2 may be brought into contact with the limiter 15, so as to improve the accuracy of the placement position of the to-be-folded device 2. The limiter 15 may be fixedly disposed on the base 5, or may be fixedly disposed on a side surface of the first bearing stage 11.

For example, the folding device may include two limiters 15, and both the two limiters 15 are located on the same side of the first bearing stage 11. Of course, the limiter 15 may also be set to other numbers.

Figure 6:
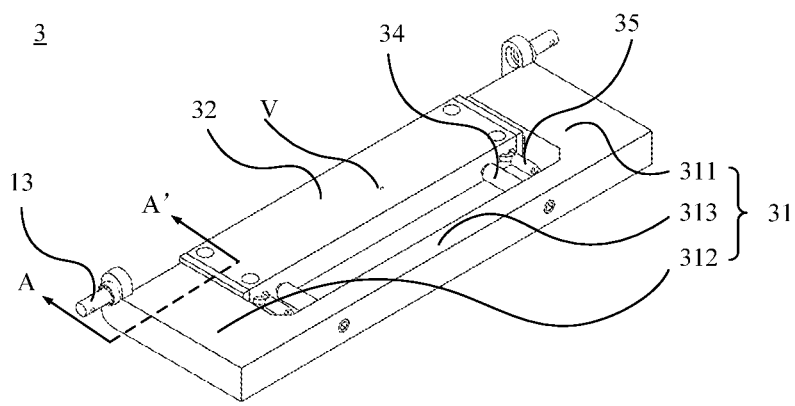
FIG. 6 is a schematic view of a folding mechanism according to some embodiments of the present disclosure.

FIG. 6 is a schematic view of a folding mechanism according to some embodiments of the present disclosure. As shown in FIG. 6, in some embodiments, the folding mechanism 3 includes: a mounting carrier 31 and a second bearing stage 32 disposed on the mounting carrier 31, The mounting carrier 31 is rotatably connected to the bearing and fixing mechanism 1, The second bearing stage 22 is provided with a second bearing surface adapted to bear the to-be-folded portion 22, and before the folding mechanism 3 performs folding, the second bearing surface may be located in the same horizontal plane as the first bearing surface, so that the to-be-folded device 2 can be horizontally placed before being folded. After the folding mechanism 3 is folded by 180° about the axis of the first rotating shaft 13, the second bearing surface is disposed to face the first bearing stage 11. The second bearing stage 32 is further provided with a second vacuum adsorption hole V, one end of the second vacuum adsorption hole V is located on the second bearing surface, and the other end of the second vacuum adsorption hole V is connected to a vacuuming device, so that the to-be-folded portion 22 is fixed on the second bearing stage 32 by vacuuming.

In some embodiments, the mounting carrier 31 includes: a first mounting arm 311 and a second mounting arm 312 disposed opposite to each other, and a connecting arm 313 fixedly connected between the first mounting arm 311 and the second mounting arm 312. The first mounting arm 311 and the second mounting arm 312 are both rotatably connected to the bearing and fixing mechanism 1, and the second bearing stage 32 is connected between the first mounting arm 311 and the second mounting arm 312.

In the embodiment of the present disclosure, one end of the first mounting arm 311 close to the first bearing stage 11 and one end of the second mounting arm 312 close to the first bearing stage 11 are fixedly connected to the two first rotating shafts 13, respectively, and the two first rotating shafts 13 are rotatably connected to the two side plates 12 on two sides of the first bearing stage 11, respectively, so that the first mounting arm 311 and the second mounting arm 312 are rotatably connected to the bearing and fixing mechanism 1. Before the second bearing stage 32 is folded, a distance between the axis of the first rotating shaft 13 and the base 5 may be larger than a distance between the second bearing surface and the base 5.

Figure 7A:
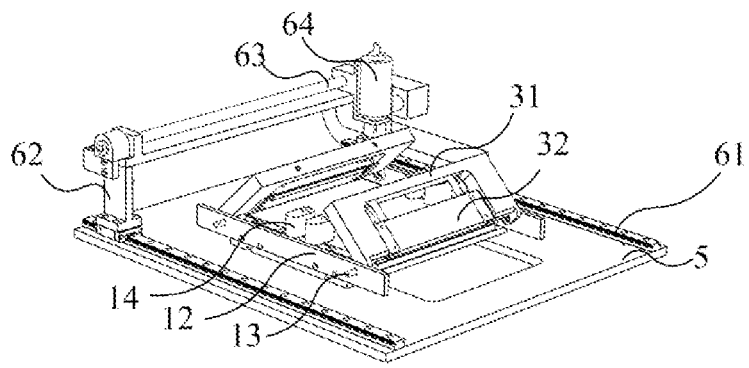
FIGS. 7a to 7c are schematic views of a folding process of the folding mechanism according to some embodiments of the present disclosure.
Figure 7B:
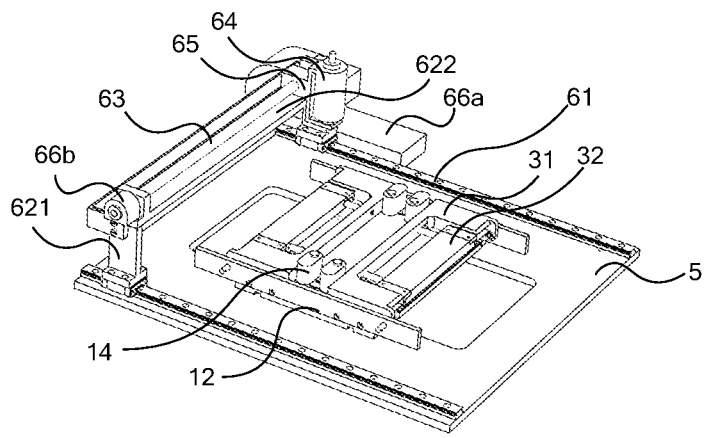
Figure 7C:
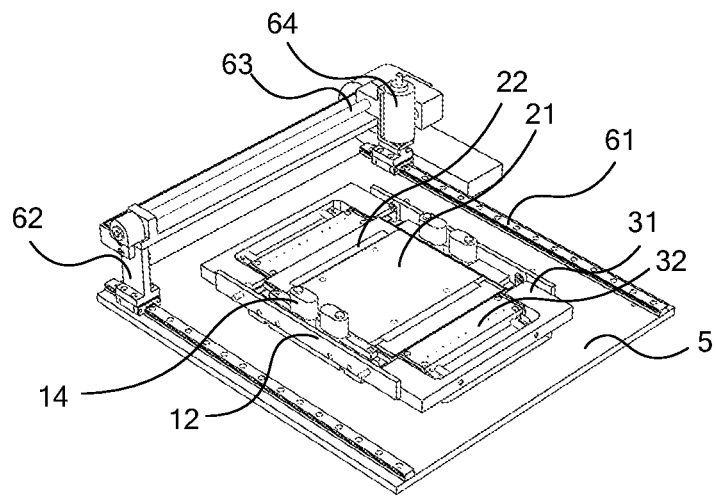

FIGS. 7a to 7c are schematic views of a folding process of the folding mechanism according to some embodiments of the disclosure, and the folding process according to the embodiments of the present disclosure will be explained below with reference to FIGS. 4 to 7c. Specifically, as shown in FIG. 4, after the to-be-folded device 2 is placed on the folding device, the main body portion 21 of the to-be-folded device 2 is located on the first bearing stage 11, and the to-be-folded portion 22 of the to-be-folded device 2 is located on the second bearing stage 32. The vacuum adsorption hole on the second bearing stage: 32 is vacuumed, so that the to-be-folded portion 22 is adsorbed on the second bearing stage 32; and the fixing member 14 is driven by the first driving member to switch to the fixed state, so that the main body portion 21 is fixed on the first bearing stage 11. As shown in FIG. 7a, the driving mechanism 4 drives the folding mechanism 3 to turn around the first rotating shaft 13, so as to drive the to-be-folded portion 22 to turn; as shown in FIG. 7b, after the driving mechanism 4 drives the folding mechanism 3 to turn by 180° about the first rotating shaft 13, the to-be-folded portion 22 is folded to the back-light side of the main body portion 21, thereby completing the folding. As shown in FIG. 7c, after the folding is completed, the second bearing stage 32 is desorbed from the to-be-folded portion 22, and the folding mechanism 3 is unfolded again to return to the initial position, and then the fixing member 14 is driven by the first driving member to switch to the unfixed state, and at this time the to-be-folded portion 2 can be removed.

It should be noted that, in some embodiments, before the folding mechanism 3 is driven to turn, glue may be applied to the to-be-folded portion 22, and the specific process is omitted herein but will be described later.

Figure 8:
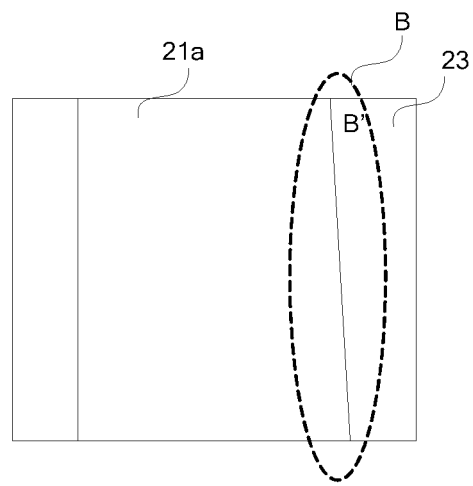
FIG. 8 is a schematic view illustrating that an edge of a bearing plate according to some embodiments of the present disclosure is inclined.
Figure 9:
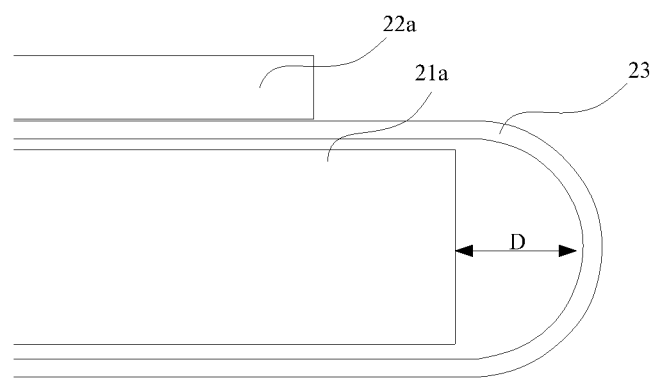
FIG. 9 is a schematic view illustrating a folding effect of the to-be-folded device according to some embodiments of the present disclosure when the edge of the bearing plate is inclined.

In the actual production process, due to fabrication errors and the like, the edges of the bearing plate 21a of the main body portion 21 may be inclined by a certain degree, that is, every two adjacent edges in the bearing plate 21a may not be perpendicular to each other, and in this case, after the to-be-folded device 2 is folded, a large gap may be generated between the flexible substrate 23 and the edge of the bearing plate 21a. FIG. 8 is a schematic view illustrating that an edge of a bearing plate according to some embodiments of the disclosure is inclined, FIG. 9 is a schematic view illustrating a folding effect of the to-be-folded device according to some embodiments of the disclosure when the edge of the bearing plate is inclined. As shown in FIG. 8 and FIG. 9, an edge of the bearing plate 21a located in the region B is not perpendicular to adjacent edges, in this case, after the to-be-folded device 2 is folded, a gapD may be generated between the flexible substrate 23 and a side surface of the bearing plate 21a, and the closer to the position B', the larger the generated gap D is, which further affects a subsequent process.

Figure 10:
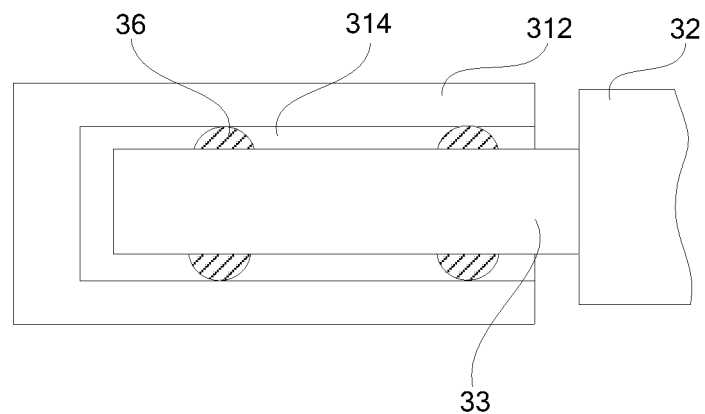
FIG. 10 is a longitudinal sectional view taken along line AA' of FIG. 6.

In view of this, the folding device of the embodiment of the present disclosure may further provide with an elastic telescopic member. Specifically, FIG. 10 is a longitudinal sectional view along line AA' in FIG. 6, and as shown in FIGS. 6 and 10, a side of the first mounting arm 311 facing the second mounting arm 312 and a side of the second mounting arm 312 facing the first mounting arm 311 are both provided with a mounting slot 314. The folding mechanism 3 further includes: a bearing stage mounts 33 provided at both ends of the second bearing stage 32, at least one support 34, and an elastic telescopic member 35. At least a portion of each bearing stage mount 33 extends into the corresponding mounting slot 314. The bearing stage mounts 33 are displaceable relative to the mounting carrier 31 in the extension direction of the first mounting arm 311. The support 34 is disposed on the connecting arm 313, the support 34 having a supporting end facing the second bearing stage 32. One end of the elastic telescopic member 35 is connected to the second bearing stage 32, and the other end of the elastic telescopic member 35 is connected to the connecting arm 313. The support 34 has an extended state and a retracted state, and when the support 34 is in the extended state, the distance between the supporting end and the connecting arm 313 is larger than the distance between the supporting end and the connecting arm 313 when the support 34 is in the retracted state, and is larger than the length of the elastic telescopic member 35 in a natural state. The natural state of the elastic telescopic member 35 means a state m which the elastic telescopic member 35 is not subjected to any tensile force or pressing force.

For example, the support 34 may be a jack screw, and the elastic telescopic member 35 may include a spring.

In the embodiment of the present disclosure, before the folding mechanism 3 performs folding, the support 34 is set to be in the extended state, so that the elastic telescopic member 35 is in a stretched state to apply a pulling force to the second bearing stage 32. When the folding mechanism 3 is performing folding, the support 34 is switched to the retracted state, at this time, the elastic telescopic member 35 will continuously apply a pulling force to the second bearing stage 32 during the folding process, the direction of the pulling force is directed from the second bearing stage 32 to the connecting arm 313, and after the folding mechanism 3 is folded by 90', the pulling force applied to the second bearing stage 32 by the elastic telescopic member 35 will bring the flexible substrate 23 in tight fit with the side surface of the bearing plate 21a, thereby ensuring that no excessive gap D will be generated between the flexible substrate 23 and the side surface of the bearing plate 21a after the folding is completed, and avoiding adverse effects caused thereby on subsequent processes.

As shown in FIG. 6, in some embodiments, the folding mechanism 3 may include two supports 34, one of the two supports 34 is disposed close to the end of the second bearing stage 32 facing the first mounting arm 311, and the other of the two supports 34 is disposed close to the end of the second bearing stage 32 facing the second mounting arm 312. In some embodiments, the support 34 may be manually controlled to switch between the extended state and the retracted state, and the support 34 may also be driven to switch between the extended state and the retracted state by a second driving member (not shown). The elastic telescopic member 35 may be connected between the second bearing stage 32 and the connecting arm 313, for example, one end of the elastic telescopic member 35 may be connected to the side surface of the second bearing stage 32 close to the connecting arm 313 side, and the other end of the elastic telescopic member 35 may be connected to the side surface of the connecting arm 313 close to the second bearing stage 32 side. The connecting arm 313 is provided with a through hole penetrating through the connecting arm 313 along the extension direction of the first mounting arm 311. The support 34 is disposed in the through hole, and the support 34 can extend and retract along the axial direction of the through hole. When the support 34 is switched to the extended state, the supporting end of the support 34 extends out from the through hole of the first mounting arm 311 and pushes the second bearing stage 32 to move in a direction away from the connecting arm 313, and at this time, as the distance between the second bearing stage 32 and the connecting arm 313 increases, the elastic telescopic member 35 will be in the stretched state.

As shown in FIG. 10, in some embodiments, the folding mechanism 3 further includes: a rolling member 36 disposed on the bearing stage mount 33, the rolling member 36 being adapted to roll along an inner wall of the mounting slot 314 to reduce friction between the bearing stage mount 33 and the inner wall of the mounting slot 314, For example, the rolling member 36 may be a spherical plunger.

In some embodiments, the upper and lower surfaces of the bearing stage mount 33 are both provided with a rolling member 36 to minimize friction between the bearing stage mount 33 and the inner wall of the mounting slot 314.

Figure 11A:
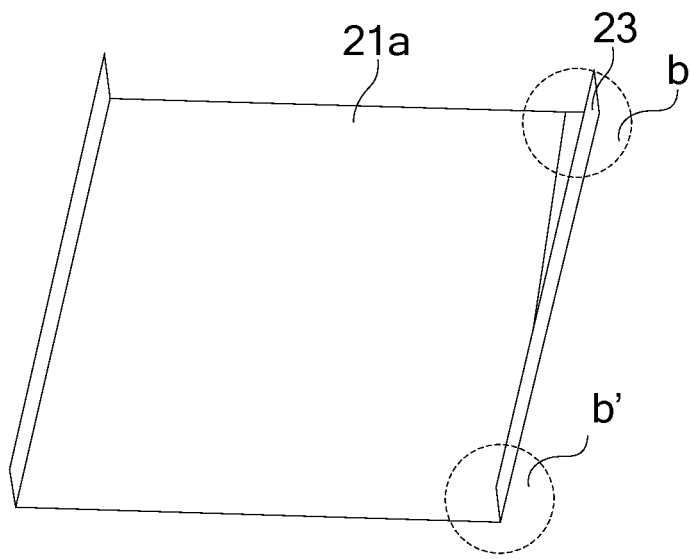
FIGS. 11a to 11b are schematic views illustrating a folding process of the to-be-folded device according to some embodiments of the present disclosure.
Figure 11B:
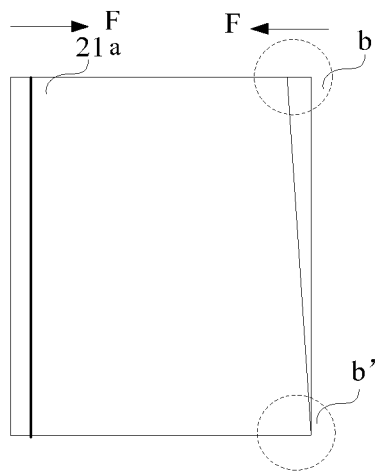
Figure 12:
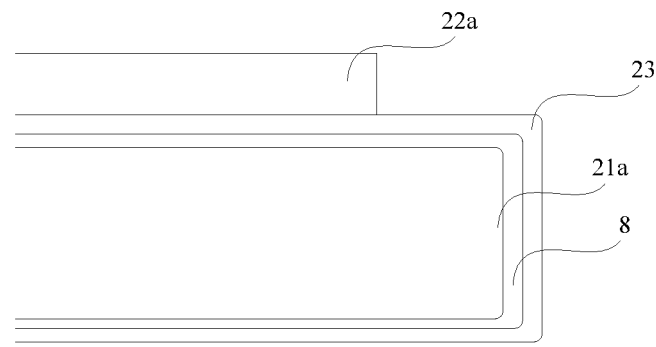
FIG. 12 is a schematic view illustrating an effect of the to-be-folded device according to some embodiments of the present disclosure after being folded.

FIGS. 11a to 11b are schematic views illustrating a folding process of a to-be-folded device according to some embodiments of the present disclosure. Referring to FIG. 6 and FIGS. 11a to 11b, before the second bearing stage 32 adsorbs the to-be-folded device 22, the support 34 is controlled to reach an extended state, so that the elastic telescopic member 35 is in the stretched state; after the to-be-folded portion 22 is adsorbed to the second bearing stage 32, the support 34 is switched to the retracted state, and the elastic telescopic member 35 in the stretched state applies a pulling force to the second bearing stage 32, and the direction of the pulling force is directed from the second bearing stage 32 to the connecting arm 313. As shown in FIG. 11a, the portions where the flexible substrate 23 is bent comprise a portion at position b and a portion at position b'. When the to-be-folded device 2 is folded, the flexible substrate 23 at the position b' fits with the bearing plate 21a, while a gap is generated between the flexible substrate 23 at the position b and the bearing plate 21a. As shown in FIG. 11b, when the folding angle of the flexible substrate 23 exceeds 90°, the flexible substrate 23 is subjected to a pulling force F toward the bearing plate 21a by the elastic telescopic member 14, and the pulling force F brings the flexible substrate 23 at the positions b and b' into close fit with the edge of the bearing plate 21a. FIG. 12 is a schematic view illustrating the effect of the to-be-folded device according to some embodiments of the present disclosure after being folded. As shown in FIG. 12, a gap between the side surface of the bearing plate 21a of the to-be-folded device 2 and the flexible substrate 23 is small, so that the side surface of the bearing plate 21a and the flexible substrate 23 can be tightly bonded through the glue 8.

It can be understood that, since the folding device of the embodiment of the disclosure can utilize the elastic telescopic member 35 to apply a pulling force to the second bearing stage 32 when the folding mechanism 3 is driven to turn, so as to tightly bond the flexible substrate 23 and the side surface of the bearing plate 21a, the folding device of the embodiment of the disclosure can obtain a tighter bonding effect even compared to the case where the to-be-folded device 2 which is normally folded (i.e. when the edge of the bearing plate 21a is not inclined).

Figure 13A:
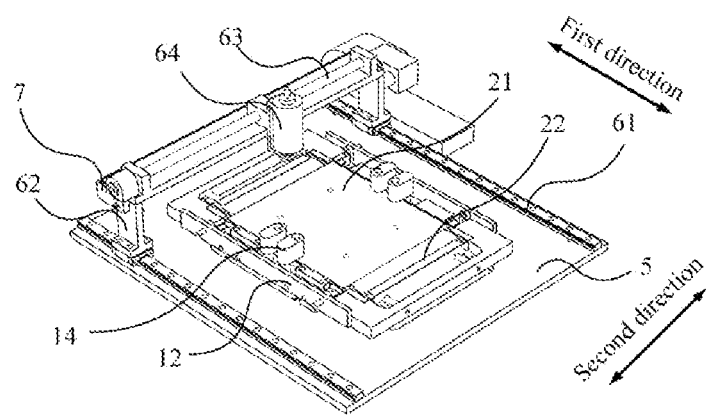
FIGS. 13a and 13b are schematic views illustrating the movement of a glue applicator mechanism according to some embodiments of the present disclosure.
Figure 13B:
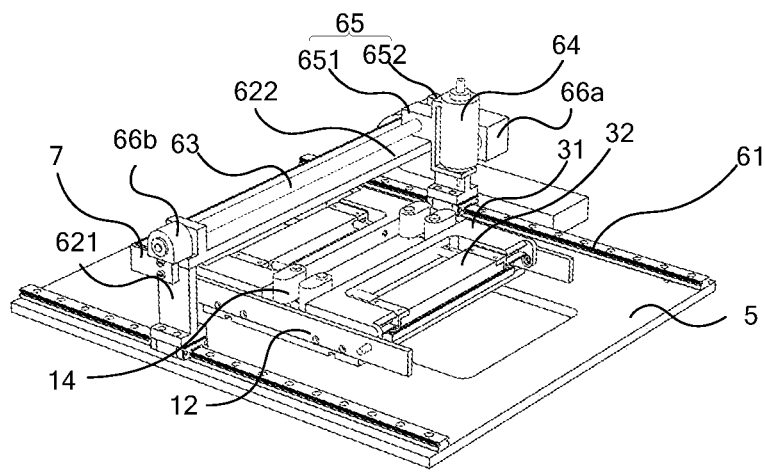

FIGS. 13a and 13b are schematic views of the movement of the glue applicator mechanism according to some embodiments of the disclosure. As shown in FIGS. 13a and 13b, in some embodiments, the folding device further includes: a glue applicator mechanism and a curing mechanism. The glue applicator mechanism is configured to apply glue to the to-be-folded portion 22. The curing mechanism is configured to cure the glue 8 on the to-be-folded portion 22 after the to-be-folded portion 22 of the to-be-folded device 2 is folded to the backlight side of the main body portion 21.

In the embodiment of the present disclosure, the curing mechanism can be disposed on the glue applicator mechanism, and the glue applicator mechanism may coat glue to the to-be-folded portion 22 after the to-be-folded portion 22 is fixed on the second bearing stage 32 and before the folding mechanism 3 performs folding. The curing mechanism may cure the glue 8 on the to-be-folded portion 22 by means of, for example, applying photo-curing or the like to the to-be-folded portion 22 after the to-be-folded portion 22 is folded to the backlight side of the main body portion 21 by the folding mechanism 3, so that the to-be-folded portion 22 is bonded to the backlight side of the main body portion 21 through the glue 8 (see FIG. 12).

In some embodiments, the second bearing stage 32 may be a transparent stage. In this way, after the folding mechanism 3 completes folding, and when the glue 8 is being cured by photo-curing, light can pass through the second bearing stage 32 and be irradiated onto the glue 8 of the to-be-folded portion 22. The word "transparent" in the embodiments of the present disclosure means a light transmission larger than 80%.

As shown in FIG. 13a, in some embodiments, the glue applicator mechanism includes: a first guide rail 61, a stand 62, a second guide rail 63 and an applicator head 64. The first guide rail 61 is disposed on the base 5, and the first guide rail 61 extends in a first direction. As described above, the first direction may be the length direction of the to-be-folded device 2. The stand 62 is disposed on the first guide rail 61, and the stand 62 is configured to move along the first guide rail 61. The second guide rail 63 is disposed on the stand 62, and the second guide rail 63 extends in a second direction intersecting the first direction, e.g., the second direction being perpendicular to the first direction. The applicator head 64 is disposed on the second guide rail 63 and configured to move along the second guide rail 63 and output the glue 8.

As shown in FIGS. 13a and 13b, in some embodiments, the bearing and fixing mechanism 1 is provided with a first guide rail 61 on both sides along the first direction. The stand 62 includes: two upright portions 621 disposed opposite to each other. The two upright portions 621 are respectively disposed on the first guide rails 61 which are located on both sides of the hearing and fixing mechanism 1; two ends of the second guide rail 63 are disposed on the two upright portions 621, respectively, and the upright portions 621 are configured to move along the first guide rail 61. Optionally, the stand 62 further includes: a beam 622 connected between the two upright portions 621, the second guide rail 63 being located on a side of the beam 622 away from the base 5. The glue applicator mechanism further includes a mounting base 65. The mounting base 65 includes a moving part 651 and a mechanical body mount 652, the moving part 651 is disposed on the second guide rail 63 and configured to move along the second guide rail 63, and the moving part 651 is further supported on the beam 622 so as to stably move along the second guide rail 63. The applicator head 64 is fixedly disposed on the mechanical body mount 652.

In some embodiments, the glue applicator mechanism further includes: a third driving member configured to drive the stand 62 to move along the first guide rail 61 and drive the applicator head 64 to move along the second guide rail 63. As shown in FIG. 13b, the third driving member may include a first motor 66a and a second motor 66b. The first motor 66a is located at one side of the stand 62 for driving the stand 62 to move along the first guide rail 61, and the second motor 66b is located at the other side of the stand 62 for driving the applicator head 64 to move along the second guide rail 63.

For example, the second guide rail 22 may be a lead screw guide rail, the moving part 651 is sleeved on the second guide rail 22, the mechanical body mounting base 652 is fixedly connected to the moving part 651, and the second motor 66b may drive the second guide rail 22 to rotate so as to drive the moving part 651 to move along the second guide rail 63, and further drive the applicator head 64 to move along the second guide rail 63.

In some embodiments, the curing mechanism includes a curing lamp, such as an Ultraviolet (UV) lamp, disposed on a side of the stand 62 facing the base 5. For example, as shown in FIG. 13b, the stand 62 further includes a curing lamp mount 7 for providing the curing lamp, the curing lamp mount 7 is connected to the upright portion 621, and the curing lamp is disposed on a side of the curing lamp mount 7 facing the base 5.

In this case, the glue on different to-be-folded portions 22 can be cured by driving the stand 62 to move along the first guide rail 61.

It should be understood that above embodiments are just examples for illustrating the principle of the invention only, however, the invention is not limited thereto. Various modifications and variations can be made by a person skilled in the art without departing from the scope of the present disclosure. These modifications and variations should be considered to be within the protection scope of the present disclosure.

What is claimed is:

1. A folding device, comprising:
    a bearing and fixing mechanism configured to bear and fix a main body portion of a to-be-folded device;
    a folding mechanism located on at least one side of the bearing and fixing mechanism, the folding mechanism being rotatably connected to the bearing and fixing mechanism and configured to bear and fix a to-be-folded portion of the to-be-folded device;
    a driving mechanism connected to the folding mechanism, the driving mechanism being configured to drive the folding mechanism to turn relative to the bearing and fixing mechanism, so as to fold the to-be-folded portion to one side in a thickness direction of the main body portion.

2. The folding device of claim 1, wherein the folding device further comprises: a base;
    wherein the bearing and fixing mechanism comprises:
    a first bearing stage disposed on the base, the first bearing stage having a first bearing surface located on a side of the first bearing stage away from the base;
    side plates located on opposite sides of the first bearing stage, the side plates being disposed on the base;
    wherein each side plate is connected to the folding mechanism through a first rotating shaft, and a distance between an axis of the first rotating shaft and the base is larger than a distance between the first bearing surface and the base.

3. The folding device of claim 2, wherein the bearing and fixing mechanism further comprises: a fixing member disposed on at least one side of the first bearing stage, the fixing member being disposed on the base, the fixing member having a fixed state and an unfixed state, wherein a portion of the fixing member in the fixed state presses and covers the main body portion; and an orthographic projection of the fixing member in the unfixed state on the base is positioned outside an orthographic projection of the first bearing stage on the base;
    wherein, the fixing member and the folding mechanism are located on different sides of the first bearing stage.

4. The folding device of claim 3, wherein the fixing member comprises:
    a second rotating shaft disposed on the base;
    a fixing part rotatably connected to the base through the second rotating shaft;
    a pressing and covering part disposed on the fixing part, the pressing and covering part having a pressing and covering end facing the to-be-folded device, the pressing and covering end of the pressing and covering part and the second rotating shaft being located on the same side of the fixing part, the pressing and covering part being capable of moving close to or away from the base, and the pressing and covering end being configured to press and cover the main body portion on the bearing and fixing mechanism when the fixing part is in the fixed state.

5. The folding device of claim 3, wherein the bearing and fixing mechanism further comprises: a first driving member connected to the fixing member and configured to drive the fixing member to switch between the fixed state and the unfixed state.

6. The folding device of claim 2, wherein the bearing and fixing mechanism further comprises: a limiter disposed on at least one side of the first bearing stage, a portion of the limiter being positioned on the first bearing surface and abutting a boundary of a preset area on the first bearing surface, the preset area being an area adapted to bear the main body portion.

7. The folding device of claim 2, wherein a first vacuum absorption hole is disposed on the first bearing stage, one end of the first vacuum absorption hole being positioned on the first bearing surface.

8. The folding device of claim 1, wherein the folding mechanism comprises:
 a mounting carrier rotatably connected to the bearing and fixing mechanism;
 a second bearing stage disposed on the mounting carrier, the second bearing stage having a second bearing surface configured to bear the to-be-folded portion, a second vacuum adsorption hole being disposed on the second bearing stage, and one end of the second vacuum adsorption hole being positioned on the second bearing surface.

9. The folding device of claim 8, wherein the mounting carrier comprises: a first mounting arm and a second mounting arm disposed opposite to each other, and a connecting arm fixedly connected between the first mounting arm and the second mounting arm; wherein the first mounting arm and the second mounting arm are each rotatably connected to the bearing and fixing mechanism, and the second bearing stage is connected between the first mounting arm and the second mounting arm.

10. The folding device of claim 9, wherein a side of the first mounting arm facing the second mounting arm and a side of the second mounting arm facing the first mounting arm are each provided with a mounting slot;
 wherein the folding mechanism further comprises:
 bearing stage mounts disposed at both ends of the second bearing stage, at least a portion of the bearing stage mount extending into the mounting slot; the bearing stage mounts being displaceable relative to the mounting carrier along an extension direction of the first mounting arm;
 at least one support disposed on the connecting arm, the support comprising a supporting end facing the second bearing stage;
 an elastic telescopic member with one end connected to the second bearing stage and the other end connected to the connecting arm;
 wherein the support has an extended state and a retracted state, when the support is in the extended state a distance between the supporting end and the connecting arm is larger than when the support is in the retracted state, and is larger than a length of the elastic telescopic member in a natural state.

11. The folding device of claim 10, wherein the folding mechanism further comprises: a rolling member disposed on the bearing stage mount and configured to roll along an inner wall of the mounting slot.

12. The folding device of claim 11, wherein both an upper surface and a lower surface of the bearing stage mount are provided with the rolling member, the rolling member being a spherical plunger.

13. The folding device of claim 10, wherein the folding mechanism comprises two of the supports, the two supports being disposed proximate an end of the second bearing stage facing the first mounting arm and an end of the second bearing stage facing the second mounting arm, respectively.

14. The folding device of claim 10, wherein the second bearing stage is a transparent stage.

15. The folding device of claim 2, wherein the folding device further comprises:
 a glue applicator mechanism configured to apply glue to the to-be-folded portion;
 a curing mechanism configured to cure the glue on the to-be-folded portion.

16. The folding device of claim 15, wherein the glue applicator mechanism comprises:
 a first guide rail disposed on the base and extending in a first direction;
 a stand disposed on the first guide rail and configured to move along the first guide rail;
 a second guide rail disposed on the stand and extending in a second direction intersecting the first direction;
 an applicator head disposed on the second guide rail and configured to output glue and move along the second guide rail.

17. The folding device of claim 16, wherein two of the first guide rails are disposed on both sides of the bearing and fixing mechanism;
 wherein the stand comprises: two upright portions disposed opposite to each other, the two upright portions being disposed on the two first guide rails on both sides of the bearing and fixing mechanism, respectively; wherein two ends of the second guide rail are disposed on the two upright portions, respectively; and the upright portions are configured to move along the first guide rail.

18. The folding device of claim 17, wherein the stand further comprises: a beam connected between the two upright portions, the second guide rail being positioned on a side of the beam away from the base;
 wherein the glue applicator mechanism further comprises a mounting base, the mounting base comprising a moving part and a mechanical body mounting part, wherein the moving part is disposed on the second guide rail and supported on the beam, the applicator head is fixedly disposed on the mechanical body mounting part, and the moving part is configured to move along the second guide rail.

19. The folding device of claim 16, wherein the glue applicator mechanism further comprises: a third driving member configured to drive the stand to move along the first guide rail, and to drive the applicator head to move along the second guide rail.

20. The folding device of claim 16, wherein the curing mechanism comprises a curing lamp disposed on a side of the stand facing the base.

* * * * *